UNITED STATES PATENT OFFICE.

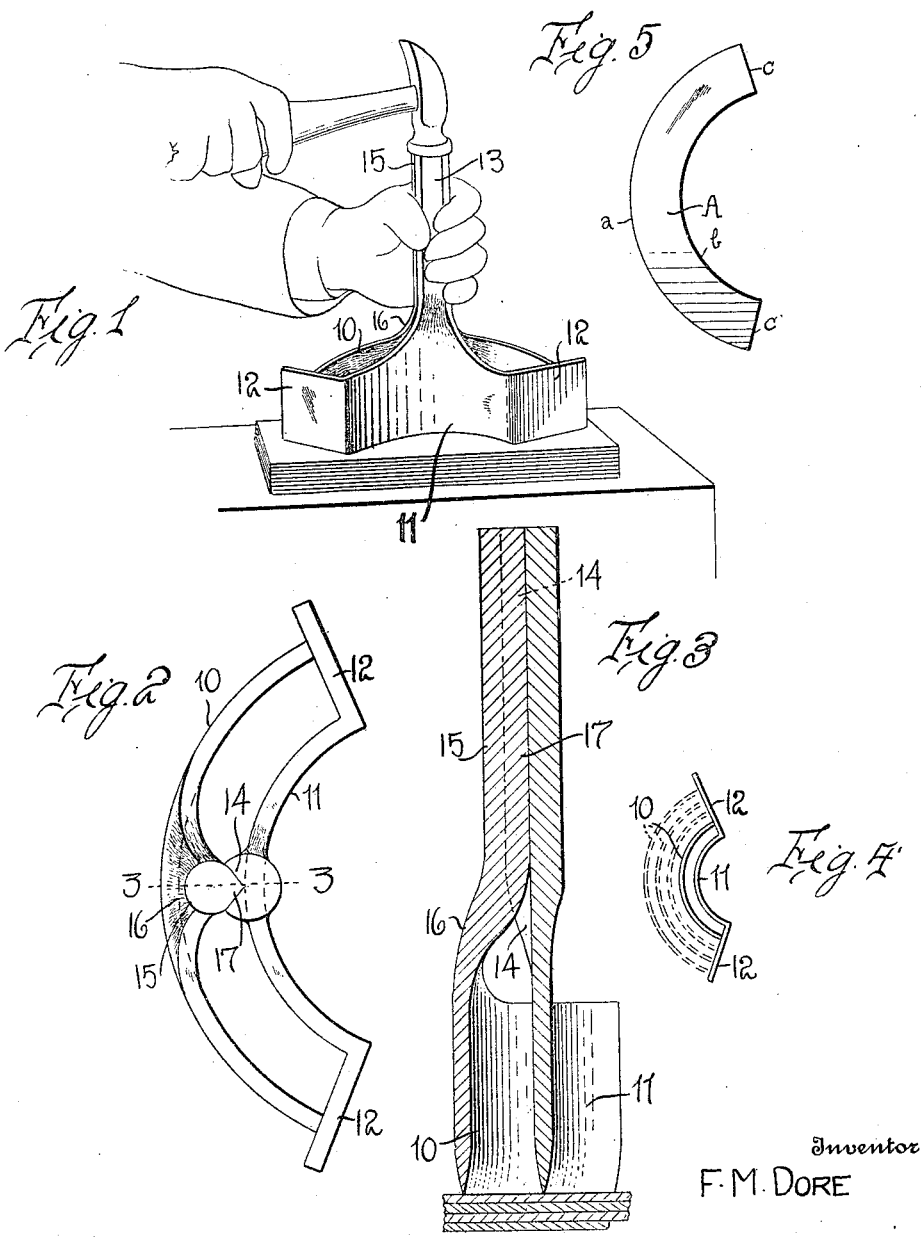

FRANK M. DORE, OF HELENA, MONTANA.

SANDPAPER-CUTTER FOR BREASTING-WHEELS.

1,211,556.   Specification of Letters Patent.   Patented Jan. 9, 1917.

Application filed June 21, 1916. Serial No. 104,988.

*To all whom it may concern:*

Be it known that I, FRANK M. DORE, a citizen of the United States, residing at Helena, in the county of Lewis and Clark and State of Montana, have invented certain new and useful Improvements in Sandpaper-Cutters for Breasting-Wheels, of which the following is a specification, reference being had to the accompanying drawings.

This invention relates to cutting tools on the order of punches and to a tool particularly designed for cutting arcuate segments of sandpaper, these segments being adapted to be applied to the breasting wheels used in the manufacture or repair of shoes. Heretofore these segments of sandpaper have been cut by arcuate punches, one punch being used to cut the inner circle of the segment and another to punch the outer circle. It has been difficult with these two punches to get the segments so that their outer and inner edges are concentric to each other and furthermore it is obvious that this takes at least two operations.

The object of this present invention is to provide a compound tool for cutting these segments at one stroke; and a further object of the invention is the provision of a tool of this description having an inner cutter which is also formed to cut the ends of the segment and an outer cutter which cuts the outside edge of the segment.

Still another object of the invention is to provide an inner cutter which may be used with different sizes of outer cutters so that segments of different widths may be cut to fit different sizes of breasting wheels and another object is to provide means whereby the outer and inner cutters may be readily connected to each other for use without any careful manipulation on the part of the worker.

Other objects of my invention will appear in the course of the following description.

My invention is illustrated in the accompanying drawings, wherein:

Figure 1 is a perspective view of my cutters in applied position; Fig. 2 is a top plan view of the same; Fig. 3 is a vertical section on the line 3—3 of Fig. 2; Fig. 4 is a diagrammatic top plan view showing the manner in which the different cutters 10 may be used with the same cutter 11; and Fig. 5 is a plan view of the sandpaper strip as cut.

Referring to these drawings 10 designates the outer cutter whose cutting edge is arcuate and may have any desired length and any desired curvature. The inner cutter is designated 11 and has a curvature which is concentric to the arc of the cutter 10. At its ends the cutter 11 is formed with the laterally extending cutting wings 12, which extend perpendicularly to the arc of the cutter 11 and have a length equal to the greatest width of the sandpaper strips to be cut by the implement.

The cutter 11 is formed at its middle with an upwardly extending shank 13 which shank, upon its outer face is formed with longitudinally extending approximately V-shaped tapering groove 14. The cutter 10 is provided with the upwardly extending shank 15 which joins the cutter 10 by an outwardly curved portion 16. This shank, above the outwardly curved portion, is inwardly deflected and beveled to provide a rib 17 which is insertible into the groove or recess 14. Now when the rib 17 is inserted in the groove 14, as illustrated in Fig. 2, the extremities of the cutter 10 will abut the outer faces of the cutting wings 12 and the curved portion 10 will be concentric to the curvature of the inner cutter 11. Now if the implement be arranged as before described and a blow or blows be struck upon the ends of the shanks 13 and 15, the two conjoined cutters will cut from the sheet of sandpaper a segmental arcuate strip A. The width of this strip A will depend upon the distance between the arcs of the inner cutter and the outer cutter. The outer cutter 10 will cut the outer edge $a$ of this strip, the inner cutter 11 will cut the edge $b$ and the wings 12 will cut the ends $c$ of the strip.

The outer cutters 10 will be made with various degrees of curvature, but when any of these cutters are disposed with the rib 17 of its shank in the groove 14, the extremities of the cutter 10 will bear against the outer faces of the wings 12 in the manner illustrated in Fig. 4, where the positions occupied by various outer cutters with relation to the inner cutter are shown. Thus the inner cutter 13 may be used with different sizes of outer cutters for cutting all sizes of paper for application to breasting wheels. It will be seen that when the rib 17 is fitted in the groove 14 that the ends of the cutter 10 are instantly brought exactly in place against the straight faces of the cutter 11 and there is no delay in getting the pieces in position or keeping them in this position preparatory to the workman striking the top of the shanks in order to cut the paper.

With this implement it is possible to cut through a large number of sheets of sandpaper and the implement is so easily adjusted as to make it extremely convenient for the purpose intended.

Having described my invention, what I claim is:

1. An implement for cutting segmental strips comprising an inner arcuate cutter with laterally projecting wings, and an outer arcuate cutter having its ends adapted to bear against said wings, the cutters being each provided with an upwardly projecting shank, one shank being longitudinally recessed and the other provided with a longitudinal rib engageable in said recess to thereby center the cutters with relation to each other.

2. A tool of the character described comprising an inner arcuate cutter having laterally extended wings and provided with a shank extending straight upward from the middle of the cutter, and an outer cutter arcuate in plan and having its ends when the cutter is in position bearing against said wings, said cutter having an inwardly deflected upwardly extending shank, one of said shanks having a portion projecting into a recess formed in the other shank whereby the two shanks may be conjoined to dispose the cutters in concentric relation.

3. A tool of the character described comprising an inner arcuate cutter having laterally extended wings and provided with a shank extending straight upward from the middle of the cutter, and an outer cutter arcuate in plan and having its ends when the cutter is in position, bearing against said wings, said cutter having an inwardly deflected upwardly extending shank, one of said shanks being formed with a rib upon its inner face and the other with a recess upon its outer face to receive such rib whereby said shanks may be conjoined to center the cutters relative to each other.

4. A tool of the character described comprising an inner arcuate cutter having laterally extending wings and provided with a shank extending straight upward from the middle of the cutter, and an outer cutter arcuate in plan and having its ends when the cutter is in position bearing against said wings, said cutter having an inwardly deflected upwardly extending shank, the shank of the inner cutter being formed upon its upper face with a vertically extending V-shaped downwardly tapering recess and the shank of the outer cutter being formed upon its inner face with a V-shaped longitudinally extending rib insertible into said recess whereby the cutters may be centered with relation to each other.

5. An implement for cutting segmental strips comprising an inner semicircular cutter with laterally projecting wings, and an outer arcuate cutter having its ends adapted to bear against said wings, the cutters being each provided with an upwardly projecting shank, the said shanks being relatively bent so that the shanks will have contact with each other when the cutters are disposed in coöperative relation.

In testimony whereof I hereunto affix my signature in the presence of two witnesses.

FRANK M. DORE.

Witnesses:
EDGAR M. HALL,
CARL ROSCH.